United States Patent
Behravan et al.

(10) Patent No.: US 8,817,719 B2
(45) Date of Patent: Aug. 26, 2014

(54) METHODS AND ARRANGEMENTS FOR DYNAMICALLY TRIGGERING THE TRANSMISSION OF SOUNDING REFERENCE SIGNAL IN A TELECOMMUNICATION SYSTEM

(75) Inventors: Ali Behravan, Stockholm (SE); David Astely, Bromma (SE); George Jöngren, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 273 days.

(21) Appl. No.: 13/256,595

(22) PCT Filed: Jun. 18, 2010

(86) PCT No.: PCT/SE2010/050685
§ 371 (c)(1),
(2), (4) Date: Sep. 14, 2011

(87) PCT Pub. No.: WO2011/102768
PCT Pub. Date: Aug. 25, 2011

(65) Prior Publication Data
US 2012/0106471 A1    May 3, 2012

Related U.S. Application Data

(60) Provisional application No. 61/306,606, filed on Feb. 22, 2010.

(51) Int. Cl.
*H04W 72/04* (2009.01)
*H04W 72/12* (2009.01)
*H04W 74/00* (2009.01)
*H04L 5/00* (2006.01)
*H04W 56/00* (2009.01)
*H04L 25/02* (2006.01)

(52) U.S. Cl.
CPC ........ *H04W 72/1289* (2013.01); *H04W 72/042* (2013.01); *H04W 74/006* (2013.01); *H04L 5/0092* (2013.01); *H04L 25/0224* (2013.01)
USPC ............ 370/329; 370/437; 455/450; 455/509

(58) Field of Classification Search
None
See application file for complete search history.

(56) References Cited

U.S. PATENT DOCUMENTS

2006/0035643 A1   2/2006  Vook et al.
2008/0267269 A1*  10/2008  Enescu et al. ................. 375/219
(Continued)

FOREIGN PATENT DOCUMENTS

JP    2007510390 A    4/2007
JP    2011077884 A    4/2011
(Continued)

OTHER PUBLICATIONS

3rd Generation Partnership Project. "Configuring SRS Transmissions in Rel. 10." 3GPP TSG RAN WG1 #59bis, R1-100133, Valencia, Spain, Jan. 19-23, 2010.
(Continued)

*Primary Examiner* — Hanh N Nguyen
*Assistant Examiner* — Joshua A Kading
(74) *Attorney, Agent, or Firm* — Coats & Bennett, PLLC

(57) ABSTRACT

The present invention relates to methods and arrangements for providing a more flexible configuration of SRS transmission. This is achieved by dynamically triggering a mobile terminal to transmit SRS. Thus, embodiments of the invention allow dynamically trigged SRS in any uplink subframe, even without necessarily reserving resources semi-statically on cell level. This is done by signaling to the terminal whether the mobile terminal should leave the predefined uplink symbol empty for sounding reference signals or use it for data transmission. In case a terminal leaves the last symbol empty for sounding reference signals, there are two possibilities, either the UE shall transmit one or several reference signals from one or several antennas, or the terminal shall leave the last symbol blank since another terminal may be using the resource for sounding. Accordingly, in a specific embodiment, there are at least three different messages that can be conveyed to the terminal: use the predefined uplink symbol for data, leave it blank or use it for sounding reference signals.

24 Claims, 11 Drawing Sheets

(56) References Cited

U.S. PATENT DOCUMENTS

2009/0042615 A1* 2/2009 Teo et al. .................. 455/562.1
2009/0109908 A1* 4/2009 Bertrand et al. ............. 370/329

FOREIGN PATENT DOCUMENTS

| JP | 2013062848 A | 4/2013 |
|----|--------------|--------|
| WO | 2008115112 A1 | 9/2008 |
| WO | 2008120925 A1 | 10/2008 |

OTHER PUBLICATIONS

3rd Generation Partnership Project. "Further Discussion on SRS Enhancements." TSG-RAN WG1 #60, R1-100860, San Francisco, USA, Feb. 22-26, 2010.

Texas Instruments, "Considerations on Aperiodic SRS", 3GPP TSG RAN WG1 #60, Feb. 22-26, 2010, San Francisco, US, R1-101094.
ASUSTeK, "Discussion on Dynamic Aperiodic Sounding", 3GPP TSG RAN WG1 Meeting #60, Feb. 22-26, 2010, San Francisco, US, R1-100997.
Nokia Siemens Networks, et al., "UL sounding", 3GPP TSG RAN WG1 Meeting #49, May 7-11, 2007, Kobe, Japan, R1-072296.
Nokia Siemens Networks, et al., "Channel sounding enhancements for LTE-Advanced", 3GPP TSG RAN WG1 Meeting #59, Nov. 9-13, 2009, Jeju, Korea, R1-094653.
Samsung, "SRS Transmission Issues for LTE-A", 3GPP TSG RAN WG1 #55bis, Jan. 14-18, 2009, Ljubljana, Slovenia, R1-090100.

* cited by examiner

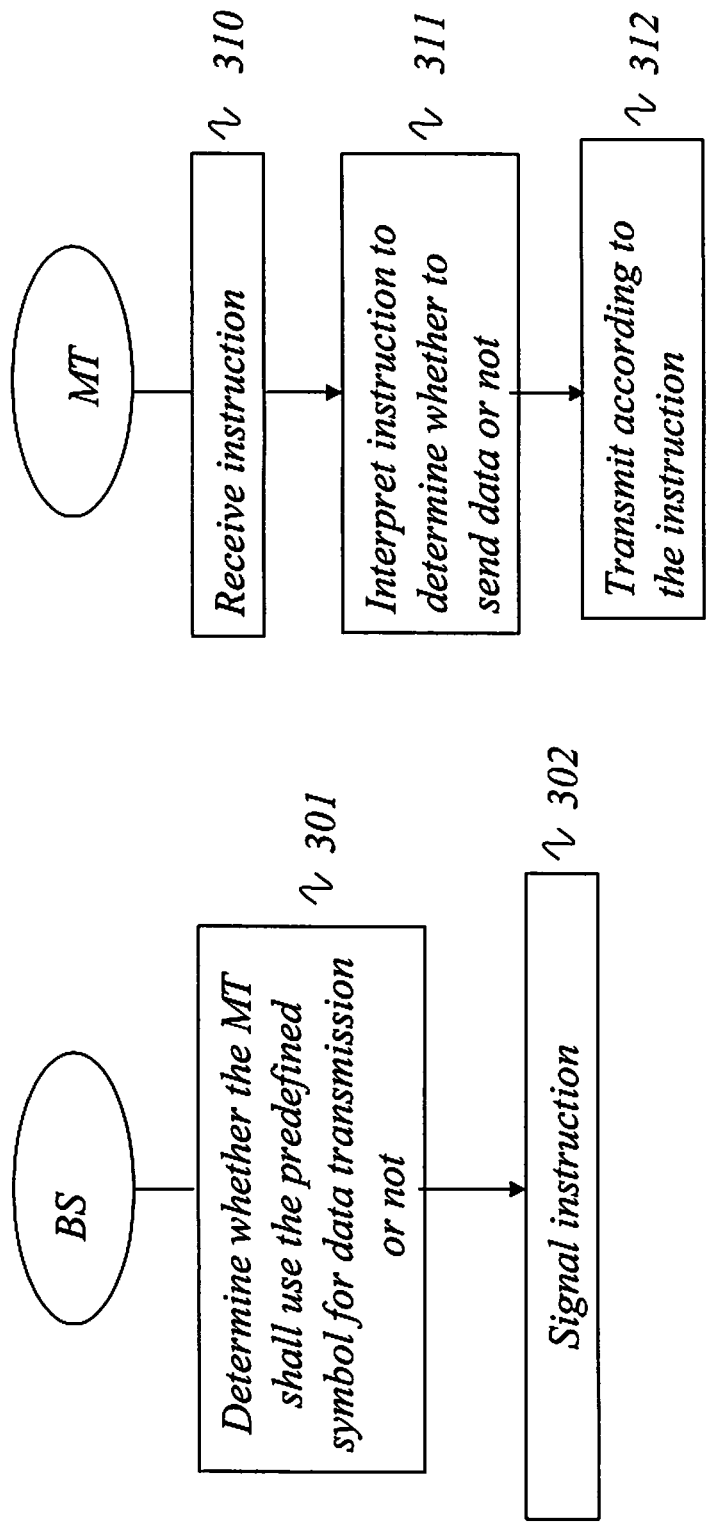

METHODS AND ARRANGEMENTS FOR DYNAMICALLY TRIGGERING THE TRANSMISSION OF SOUNDING REFERENCE SIGNAL IN A TELECOMMUNICATION SYSTEM

TECHNICAL FIELD

The present invention relates to methods and arrangements for transmission of sounding reference symbols (SRS).

BACKGROUND

Sounding reference signals (SRS) are one type of reference signals that are transmitted by mobile terminals so that the base station can estimate the uplink channels used by the mobile terminal. In the context of Long Term Evolution (LTE) the mobile terminals are referred to as User Equipments (UEs) and the base stations are referred to eNBs. The channel estimates may be used for uplink scheduling and link adaptation but also for downlink multiple antenna transmission, especially in case of TDD (Time Division Duplex) in LTE where the uplink and downlink use the same frequencies. The sounding reference signals are in part defined in technical specification 3GPP TS 36.211 and have time duration of a single OFDM (Orthogonal Frequency Division Multiplex) symbol. In the uplink of LTE system a special type of OFDM, called DFTS-OFDM (Discrete Fourier Transform Spread OFDM), is used.

Sounding reference signals can be transmitted in the last symbol of a 1 ms uplink subframe. This is illustrated in FIG. 1 where a frame of 10 ms is shown. Each frame is divided into 10 subframes and one subframe can carry 12 or 14 symbols depending on whether a normal cyclic prefix or extended cyclic prefix is used. In LTE, the uplink symbols are DFTS-OFDM (Discrete Fourier Transform Spread-Orthogonal Frequency Division Modulation) symbols which also are referred to as SC-FDMA (Single Carrier-Frequency Division Multiple Access).

For the case with TDD, the sounding reference signals can also be transmitted in the special time slot called UpPTS, which is the uplink part of a special subframe. The special subframe further comprises a downlink part, DwPTS, and a guard period. The length of UpPTS can be configured to be one or two symbols. FIG. 2 shows an example for TDD with 3 downlink subframes, 2 uplink subframes within a 10 ms radio frame. Up to eight symbols may be set aside for the sounding reference signals.

The configuration of SRS symbols, such as SRS bandwidth, SRS frequency domain position, SRS hopping pattern and SRS subframe configuration are set semi-statically as a part of RRC information element defined in the technical specification 3GPP TS 36.331. There are in fact two different configurations
  Cell specific SRS configuration, which is further described in 3GPP TS 36.211.
  UE specific configuration, which is further described in 3GPP TS 36.213.

The cell specific configuration indicates to all UEs in a cell in which subframe the last symbol of the subframe, or the special slot referred to as UpPTS, can be used for sounding.

In normal uplink subframes, PUSCH (Physical Uplink Shared Channel) transmission which overlaps in the frequency domain with a cell specific subframe will be shortened in the sense that the last uplink symbol is not used for data transmission in the uplink. Furthermore, in subframes where cell specific SRS resources have been reserved, terminals in the cell should use shortened PUCCH (physical Uplink Control Channel) format when transmitting ACK/NACK or scheduling requests, which is referred to as formats 1a/1b/1. The shortened PUCCH format implies that the last symbol in the subframe is not used for transmission of control information. There are also certain rules that should be applied when the UE shall transmit the SRSs. For example, the UE shall not transmit an SRS in a subframe where a CQI (channel quality indication) report using PUCCH format 2 is transmitted.

The UE specific configuration is as the name indicates UE specific and indicates to the terminal a pattern of subframes and frequency domain resources to be used for the SRS. The UE specific configuration also indicates other parameters that the UE shall use when transmitting the SRS, such as frequency domain comb and cyclic shift.

This means that SRSs from different terminals can be multiplexed in the time domain, by transmitting the SRS in different subframes. Furthermore, within the same symbol, sounding reference signals can be multiplexed in the frequency domain. The set of subcarriers is divided into two sets of subcarriers, or combs with the even and odd subcarriers respectively in each such set. Additionally, the UEs may have different bandwidth to get additional Frequency Division Multiplexing (FDM). The comb enables frequency domain multiplexing of signals with different bandwidths and also overlapping. Additionally code division multiplexing (CDM) can be used. Then different users can use exactly the same time and frequency domain resources by using different shifts of a basic base sequence. An example illustrating the multiplexing possibilities is given in FIG. 3 where it is shown how SRS from different users can be multiplexed in the frequency domain and the time domain.

In LTE Rel-8/Rel-9, resources for transmission of sounding reference signals are reserved on a cell level by higher layers. Users in a cell are then semi-statically configured to transmit sounding reference signals using the resources reserved in the cell. When resources are reserved for sounding, they are taken from the cell and hence from all user in the cell. As a result regardless of whether there is a need for the UEs to sound the channel or not, the resources are taken from all users and can not be used for data transmission.

In a cell with a certain number of users, the period of SRS transmission is specified by the number of users and the bandwidth of SRS. When a large number of users share the SRS resources, the SRS period might become too large for some users, such as users with fast changing channels who need more frequent update from their channels, while for some other users this period may be too frequent.

SUMMARY

It can be noted that semi-static configuration of SRS transmission is inflexible, in a sense that resources can not be prioritized according to the current needs of a UE. It is therefore an aim of the embodiments of the present invention to provide a more flexible configuration of SRS transmission.

This is achieved by dynamically triggering a mobile terminal to transmit SRS. Thus, embodiments of the invention allow dynamically triggered SRS in any uplink subframe, even without necessarily reserving resources semi-statically on cell level. This is done by signaling to the terminal whether the mobile terminal should leave a predefined uplink symbol empty for sounding reference signals or use it for data transmission. In case a terminal leaves the predefined uplink symbol empty for sounding reference signals, there are two possibilities: either the UE shall transmit one or several reference signals from one or several antennas, or the terminal shall leave the predefined uplink symbol blank since another terminal may be using the resource for sounding.

Accordingly, in a specific embodiment, there are at least three different messages that can be conveyed to the terminal: use the predefined uplink symbol for data, leave it blank or use it for sounding reference signals.

According to a first aspect of embodiments of the present invention, a method in a base station for dynamically triggering a mobile terminal to transmit SRS is provided. A predefined uplink symbol of an uplink subframe is configured to be used by the mobile terminal for SRS. In the method, it is determined whether the mobile terminal shall use the predefined uplink symbol for data transmission or not during uplink transmission. It is then signaled to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

According to a second aspect of embodiments of the present invention, a method in a mobile terminal for dynamically transmitting SRS is provided. A predefined uplink symbol of an uplink subframe is configured to be used by the mobile terminal for SRS. In the method, the mobile terminal receives instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. In subsequent steps the mobile terminal determines whether to send data or not in the predefined uplink symbol based on the received instruction, and transmits in the uplink according to said determination.

According to a third aspect of embodiments of the present invention a base station for dynamically triggering a mobile terminal to transmit SRS is provided. A predefined uplink symbol of an uplink subframe is configured to be used by the mobile terminal for SRS. The base station comprises a processor configured to determine whether the mobile terminal shall use the predefined uplink symbol for data transmission or not during uplink transmission, and a transmitter configured to signal to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

According to a fourth aspect of embodiments of the present invention, a mobile terminal for dynamically transmitting SRS is provided. A predefined uplink symbol of an uplink subframe is configured to be used by the mobile terminal for SRS. The mobile terminal comprises a receiver configured to receive instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. The mobile terminal further comprises a processor configured to determine whether to send data or not in the predefined uplink symbol based on the received instruction, and a transmitter configured to transmit in the uplink according to said determination.

An advantage with embodiments of the present invention is that it is possible to achieve flexibility in using SRS whenever it is needed. Thus any uplink subframe can be used for SRS, not only subframes in which SRS resources are reserved semi-statically.

A further advantage with embodiments of the present invention is that user-based SRS assignment is provided, which is more fair towards users with no need for SRS transmission.

A yet further advantage with embodiments of the present invention is that it is avoided to reserve resources for SRS when no need for SRS exists. That implies that more resources for SRS can be given to those mobile terminals that need to send SRS more frequently.

Other objects, advantages and novel features of the invention will become apparent from the following detailed description of the invention when considered in conjunction with the accompanying drawings and claims.

BRIEF DESCRIPTION OF THE DRAWINGS

FIG. 10 is a flowchart showing a method in a base station according to an example embodiment.

FIG. 11 is a flowchart showing a method in a mobile terminal according to an example embodiment.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

The present invention is exemplified in the following non-limiting description of embodiments of the invention. Moreover, the following embodiments are described in the context of an LTE network but the embodiments of the present invention can also be applied in other networks.

Figure 4:
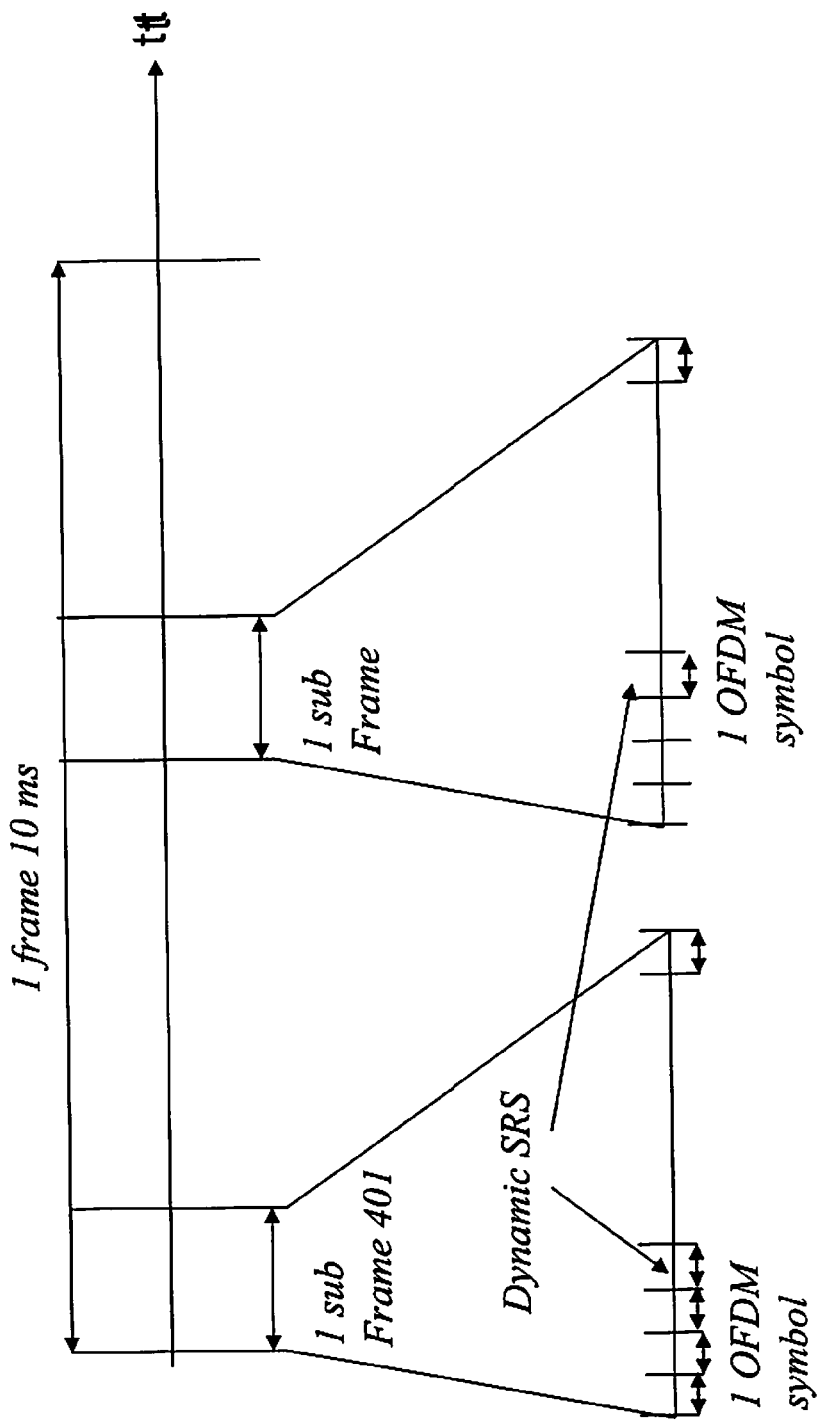
FIG. 4 is a block diagram illustrating the positioning of a dynamically configured sounding reference signal on an uplink frame according to an example embodiment.

It should also be noted that although a predefined uplink symbol to be used for SRS transmission is exemplified as the last symbol, the predefined uplink symbol could be any predefined uplink symbol in a subframe. In FIG. 4, the fourth symbol is exemplified as the predefined uplink symbol. In addition since the embodiments of the invention are exemplified in the context of LTE, the uplink symbols are DFTS-OFDM uplink symbols. It should however be understood by a person skilled in the art that the embodiments of the present invention are not limited to DFTS-OFDMA.

As stated above, in existing LTE networks e.g. LTE release 8/9, SRS is transmitted over a semi-statically assigned bandwidth and periods. In future networks the number of UE antennas per user will increase, which implies that the resources for SRS become scarcer. This requires a more efficient management of the available resources for SRS and more importantly to avoid reserving resources which are only seldom used.

In addition, depending on the time-variation and frequency selectivity of the channels as well as due to the burstiness of the traffic, some UEs or some antennas of a UE may need to get a more frequent update of their channels than other. However, there is typically only a need for SRS when there is traffic to be transmitted in accordance to the traffic burstiness.

To address the need for more flexible SRS configuration, methods and arrangements for dynamically configuring SRS transmission based on the current situation are provided. By using embodiments of the present invention dynamic UE specific SRS configuration can be done on any subframe.

Figure 5:
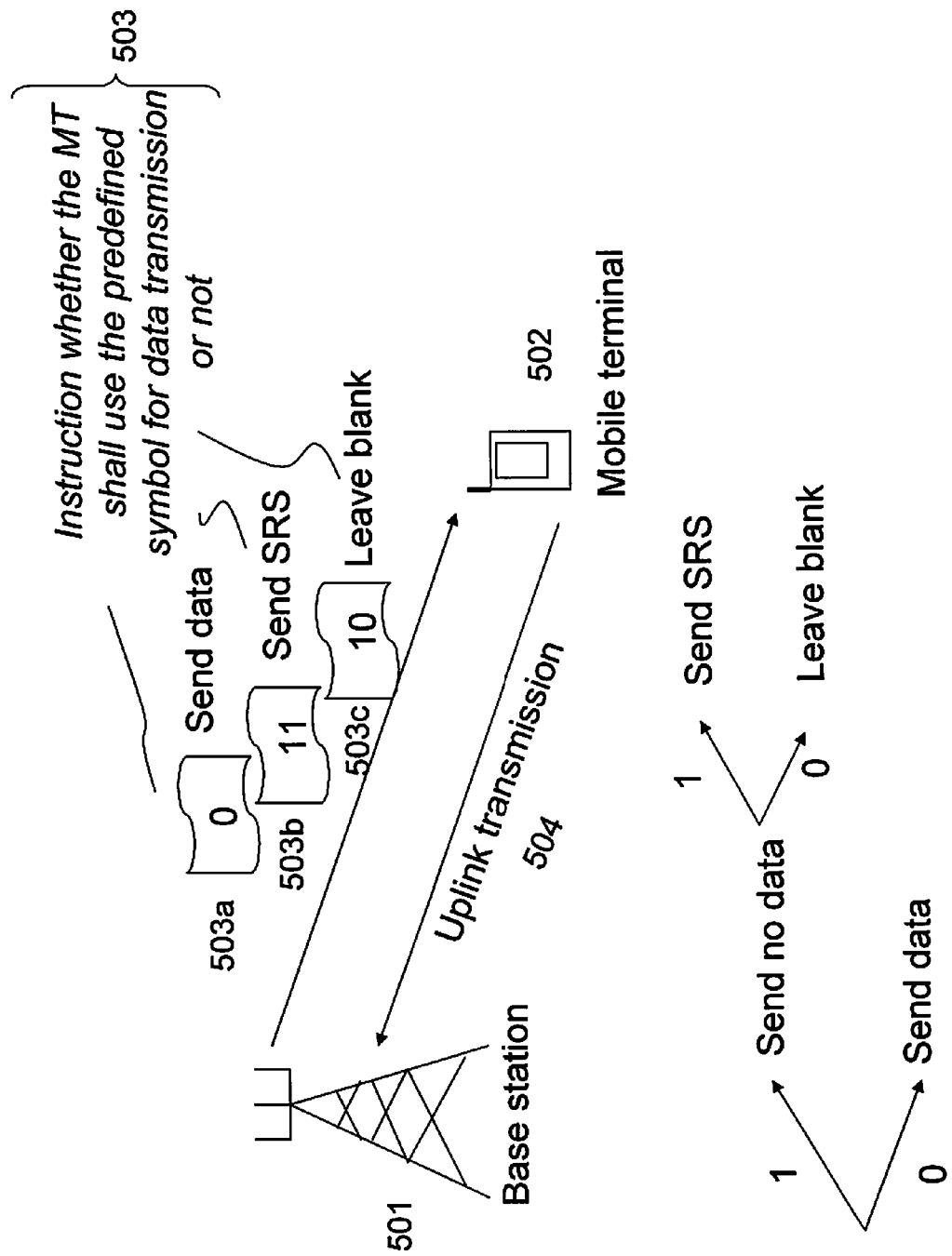
FIG. 5 is a block diagram illustrating a base station signaling a mobile terminal instructions on the use of a predefined uplink symbol according to an example embodiment.

FIG. 5 illustrates an embodiment of the present invention. The base station 501 of FIG. 5 is configured to dynamically trigger the mobile terminal 502 to transmit sounding reference signals (SRS) wherein a predefined uplink symbol, such as an DFTS-OFDM symbol, of an uplink subframe is configured to be used by the mobile terminal for SRS. That is achieved by the base station 501 by determining whether the mobile terminal shall use the predefined uplink symbol for data transmission or not during uplink transmission. In situations when the channel changes rapidly e.g. due to time-variation and frequency selectivity of the channel and when the traffic is bursty, SRS transmission is required more frequently than in other situations. Thus, this is taken into account when the base station determines whether the mobile terminal shall use the predefined uplink symbol for data transmission or not during uplink transmission. Then the base station 501 signals 503 to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission. As illustrated in FIG. 5, the signaled instruction of "0" 503a implies send data, "11" 503b implies send SRS and "10" 503c implies that the predefined uplink symbol should be left blank. Based on the received instruction 503, the mobile terminal configures its uplink transmission accordingly 504.

Hence, three cases of dynamic SRS configurations need to be signaled to the UEs:

In the first alternative, the base station signals to the mobile terminal to not puncture the data on the predefined uplink symbol, i.e. to send data. In the second alternatives, the base station signals information to the mobile terminal to puncture the data on the predefined uplink symbol, i.e. to send no data, and this information comprises further to send SRS according to the second alternative and to leave the predefined uplink symbol blank according to the third alternative. To signal these three alternatives, only two bits are enough as shown in FIG. 5.

It should be noted that there is no need to have a hierarchical structure when composing the instruction as illustrated in FIG. 5, but that there are at least three different messages that can be sent from the base station to the mobile terminal. Furthermore, it is also possible to envision that the mobile terminal is configured with a set of different SRS parameters so that different messages can be used to transmit SRS parameters, for example of different bandwidths or with different positions in the frequency domain. To exemplify, the instruction signaled to the mobile terminal may comprise the following alternatives:

1. Transmit data on PUSCH also in the predefined uplink symbol.
2. Do not transmit any data on PUSCH in the predefined uplink symbol, leave it empty
3. Do not transmit any data on PUSCH in the predefined uplink symbol. Instead, transmit an SRS in the predefined uplink symbol with bandwidth b1, comb c1, cyclic shift s1 and frequency domain starting position f1.
4. Do not transmit any data on PUSCH in the predefined uplink symbol. Instead, transmit an SRS in the last symbol with bandwidth b2, comb c2, cyclic shift s2 and frequency domain starting position f2.

Turning now to FIG. 10 and FIG. 11, where flowcharts of the methods in the base station and the mobile terminal, respectively, are illustrated. As shown in FIG. 10 a method in a base station for dynamically triggering a mobile terminal to transmit SRS is provided. A predefined uplink symbol of an uplink subframe is configured to be used by the mobile terminal for SRS. In a first step the base station determines 301 whether the mobile terminal shall use the predefined uplink symbol for data transmission or not during uplink transmission. In a next step, the base station signals 302 to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

A method in a mobile terminal for dynamically transmitting SRS is shown in FIG. 11. As stated above, a predefined uplink symbol of an uplink subframe is configured to be used by the mobile terminal for SRS. The mobile terminal receives 310 instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. The mobile terminal interprets the received instruction to determine 311 whether to send data or not in the predefined uplink symbol based on the received instruction, and transmits 312 the SRS in the predefined uplink symbol according to said determination.

The instruction signaled from the base station and received at the mobile terminal may either be valid for the predefined uplink symbol of one subsequent uplink subframe or for the predefined uplink symbol of multiple subsequent uplink subframes.

The predefined uplink symbol may by default be used for data transmission, or by default be used for SRS. If the predefined uplink symbol is by default used for SRS, by the current mobile terminal, or by other mobile terminals wherein the predefined uplink symbol is left blank by the current mobile terminal, the signaling 302 to the mobile terminal is performed if the predefined uplink symbol should be used for data transmission. Whether the current mobile terminal should send SRS or leave it blank such that the predefined uplink symbol can be used by other mobile terminals, can be instructed by the base station.

However, if the predefined uplink symbol is by default used for data transmission, the signaling 302 to the mobile terminal is performed if the predefined uplink symbol should not be used for data transmission, which implies that the signaled instruction from the base station to the mobile station comprises information whether the mobile terminal should send SRS or leave it blank for other mobile terminals.

Figure 12:
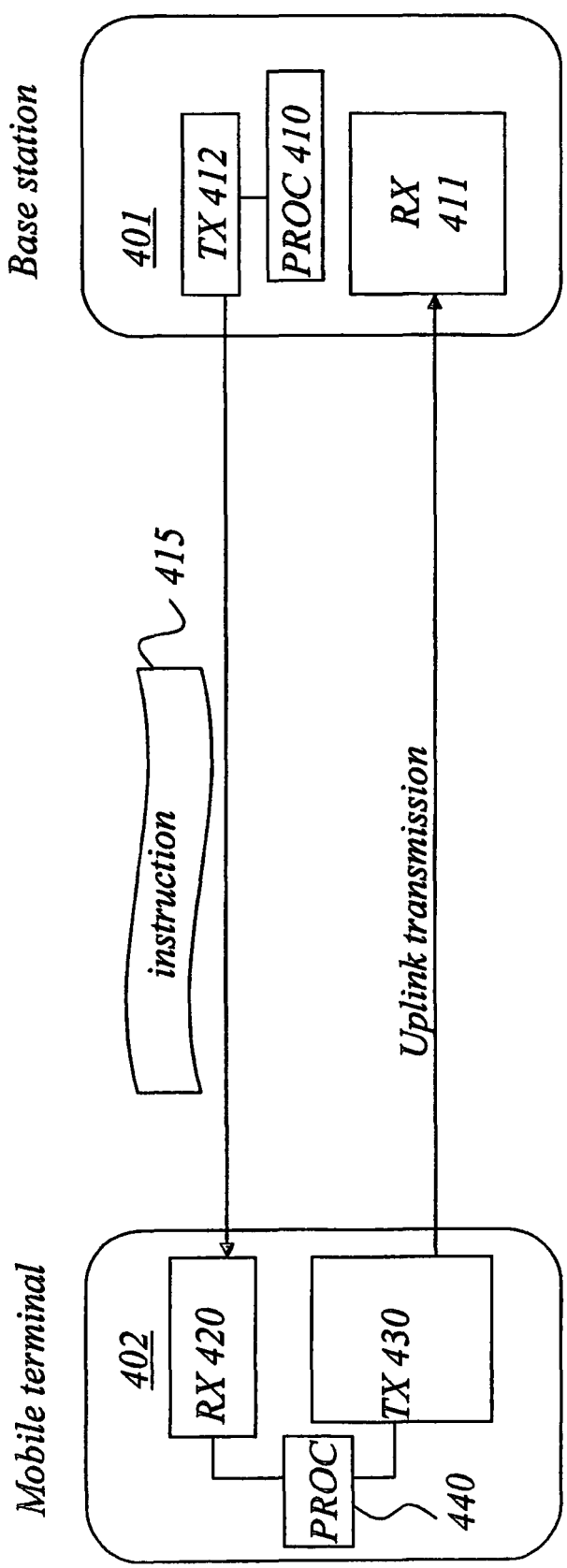
FIG. 12 is a block diagram illustrating interaction between a mobile terminal and a base station according to an example embodiment.

Accordingly, with reference to FIG. 12, the base station 401 comprises a processor 410 configured to determine whether the mobile terminal 402 shall use the predefined uplink symbol for data transmission or not during uplink transmission, and a transmitter 412 configured to signal to the mobile terminal 402 instruction 415 whether the mobile terminal 402 shall use the predefined uplink symbol for data transmission or not during uplink transmission. The signaled instruction 415 further comprises information whether the mobile terminal shall use the predefined uplink symbol for SRS or leave the predefined uplink symbol blank if the predefined uplink symbol shall not to be used for data transmission. In addition, the base station comprises a receiver 411 for receiving the uplink transmission from the mobile terminal 402.

According to an embodiment of the present invention, the transmitter 412 is configured to signal to the mobile terminal the instruction 415 as downlink control information carried by the physical downlink control channel.

Moreover, the mobile terminal comprises a receiver 420 configured to receive instruction 415 whether the mobile terminal 402 shall use the predefined uplink symbol for data transmission or not during uplink transmission. The received instruction further comprises information whether the mobile terminal 402 shall use the predefined uplink symbol for SRS or leave the predefined uplink symbol blank if the predefined uplink symbol shall not be used for data transmission. The mobile terminal 402 further comprises a processor 440 configured to determine whether to send data or not in the predefined uplink symbol based on the received instruction, and a transmitter 430 configured to transmit the SRS in the predefined uplink symbol according to said determination.

In accordance with one embodiment of the present invention, the receiver 420 is configured to receive the instruction 415 as downlink control information carried by the physical downlink control channel.

In case of dynamic configuration, the information whether the mobile terminal shall use the predefined uplink symbol for data transmission or not during uplink transmission e.g. sent in an uplink scheduling grant which is part of downlink control information (DCI) format 0. The DCI is carried by physical downlink control channel (PDCCH), which is sent over the 1-4 OFDM symbols in each subframe. This means that the dynamic of SRS configuration can have a resolution as high as every subframe.

The dynamically configured reference signals according to embodiments of the present invention can for example be mapped to every second subcarrier in the frequency domain, as in the case for the sounding reference signals defined for Release 8/9 in LTE using a so called repetition factor of 2, or be mapped to every subcarrier, which is the case with the uplink demodulation reference signals for Release 8/9 in LTE. SRSs associated with different mobile terminal antennas may be code division multiplexed using different cyclic shifts of a certain sequence, such as a Zadoff Chu sequence.

Figure 1:
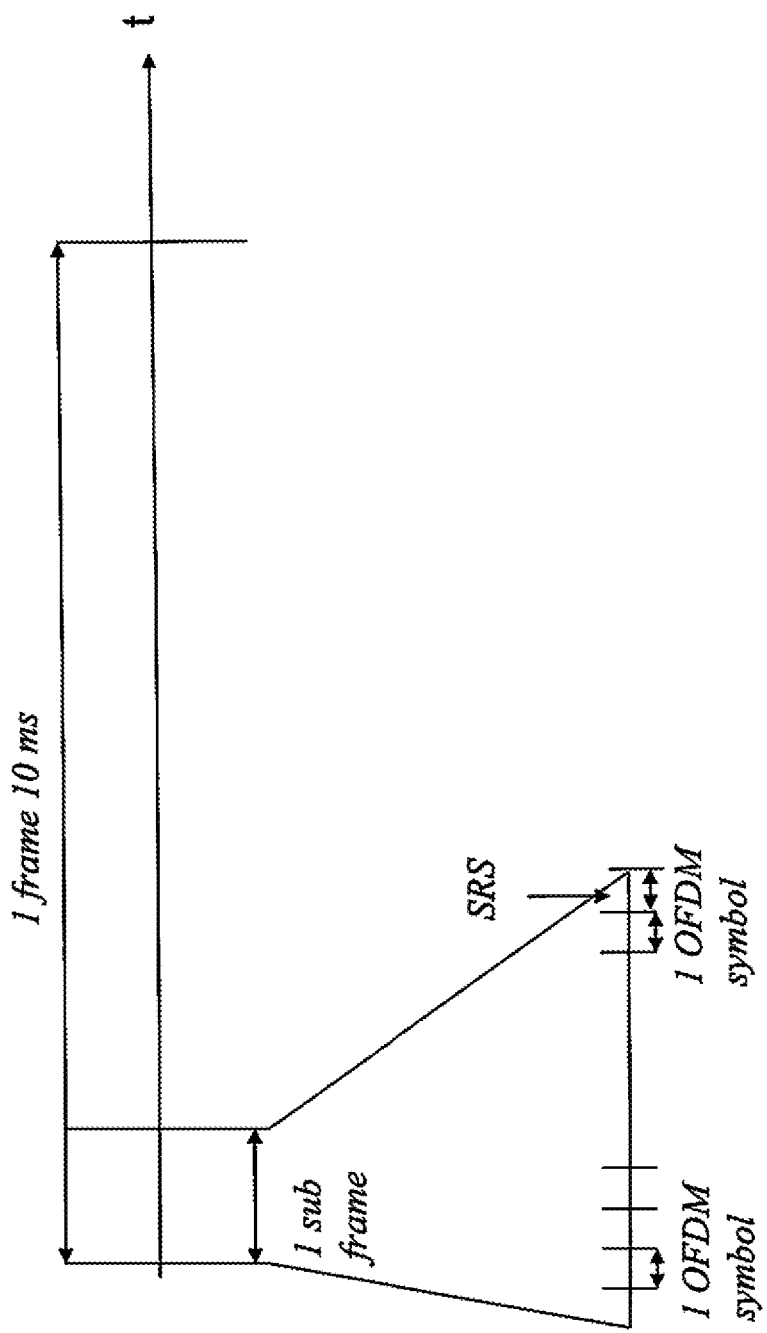
FIG. 1 is a block diagram illustrating an example 10 ms uplink frame.
Figure 2:
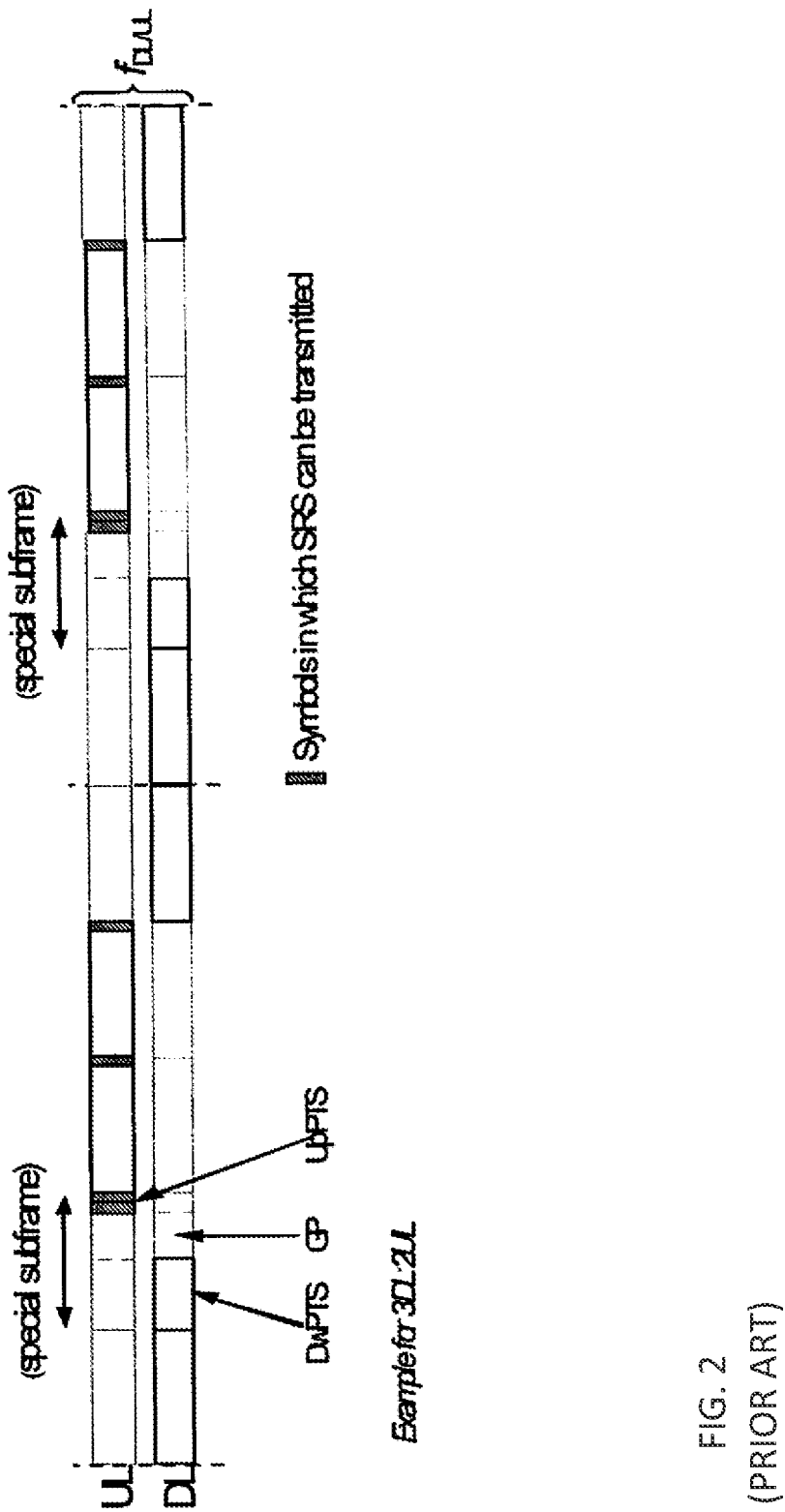
FIG. 2 is a block diagram illustrating an example of subframes usable in a time division duplex scheme.
Figure 3:
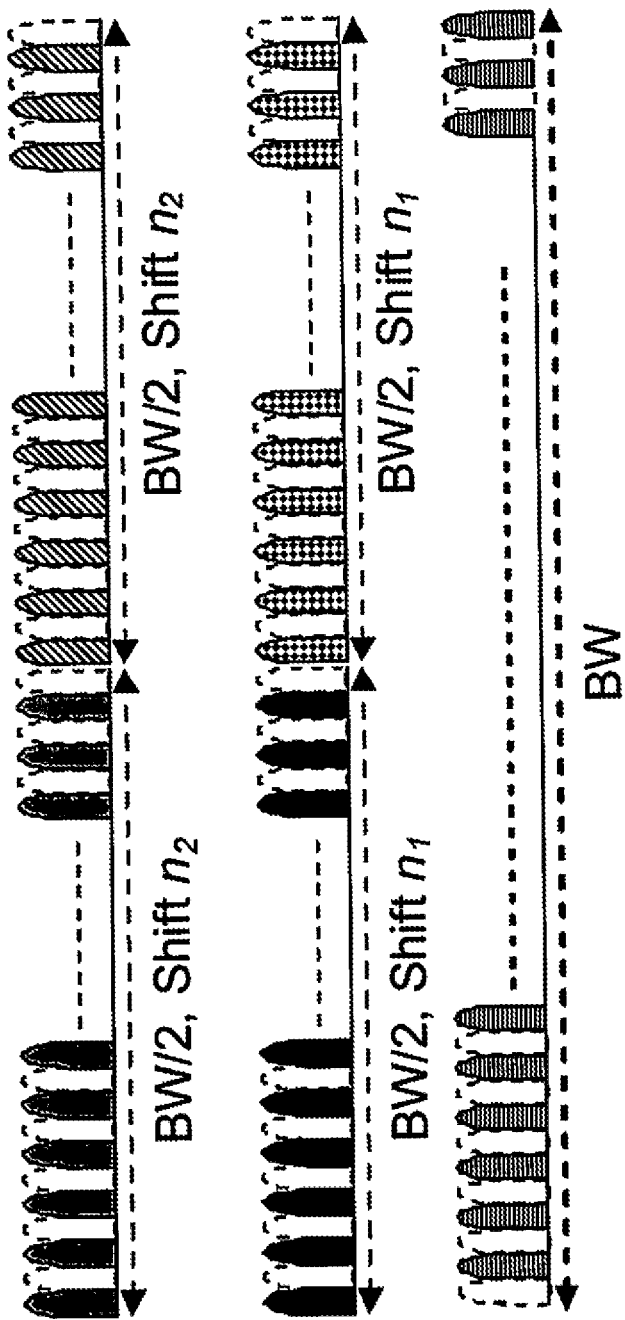
FIG. 3 is a block diagram illustrating an example of multiplexing in the frequency domain and the time domain.

For LTE, a 10 ms radio frame is divided into ten subframes with duration of 1 ms, and in each 1 ms subframe, 12 or 14 DFTS-OFDM symbols are transmitted depending on whether normal or extended cyclic prefix length is used as illustrated in FIGS. 1 and 4. As stated above, the dynamically configured SRSs does not have to be transmitted in the last uplink symbol of subframe, but the symbol can be predefined as well as dynamically or semi-statically configured in any of the uplink symbols. It should also be noted that not only one uplink symbol but several uplink symbols can be used.

The dynamically configured SRS according to embodiments of the present invention can be self-contained, which implies that the SRS is transmitted within the resources assigned for data transmission, i.e. PUSCH resources. Also, RRM (Radio Resource Management) parameters may be configured such that the configuration parameters for the dynamic SRS of the invention can be the same as the ones for periodic SRS transmission and the configuration can be done semi-statically as a part of RRC (Radio Resource Control) information elements.

Thanks to the dynamically configured aperiodic SRS provided by embodiments of the present invention, SRS transmissions can be requested when there is a need for sounding. The base station is then able to dynamically request transmission of an SRS in a certain subframe. For example that can be done as part of an uplink grant so that the SRS is transmitted in the same subframe as the data. The signaled instruction may comprise parameters which can be semi-statically configured and may also be a function of the subframe, be partially determined by the PUSCH allocation, or be partially dynamically signaled in the uplink grant.

However, if the cell specific resource has not been reserved, other users may transmit data in the predefined uplink symbol of the subframe, and this would then collide with the SRS transmission. Hence according to embodiments of the invention, the mobile terminal can also be dynamically instructed to leave the last symbol empty to allow for another mobile terminal to transmit an SRS without any overlap.

In another case, the cell may have reserved resources, e.g. the last symbol, for SRS, and this means that existing mobile terminals, e.g. LTE release 8/9 UEs, must leave the last symbol empty and hence less symbols can be used for data transmission. At the same time, a mobile terminal according to the present invention could, if instructed by the base station, use these resources for data transmission. The allocation of the SRS resources is under the control of the base station which knows if SRS will be transmitted from any users in the cell. Thus when dynamic SRS is configured in a subframe, the base station instructs one mobile terminal to send SRS, and at the same time instructs the other mobile terminals that send data on the designated SRS resources to puncture their data, i.e. to not transmit data.

Figure 6:
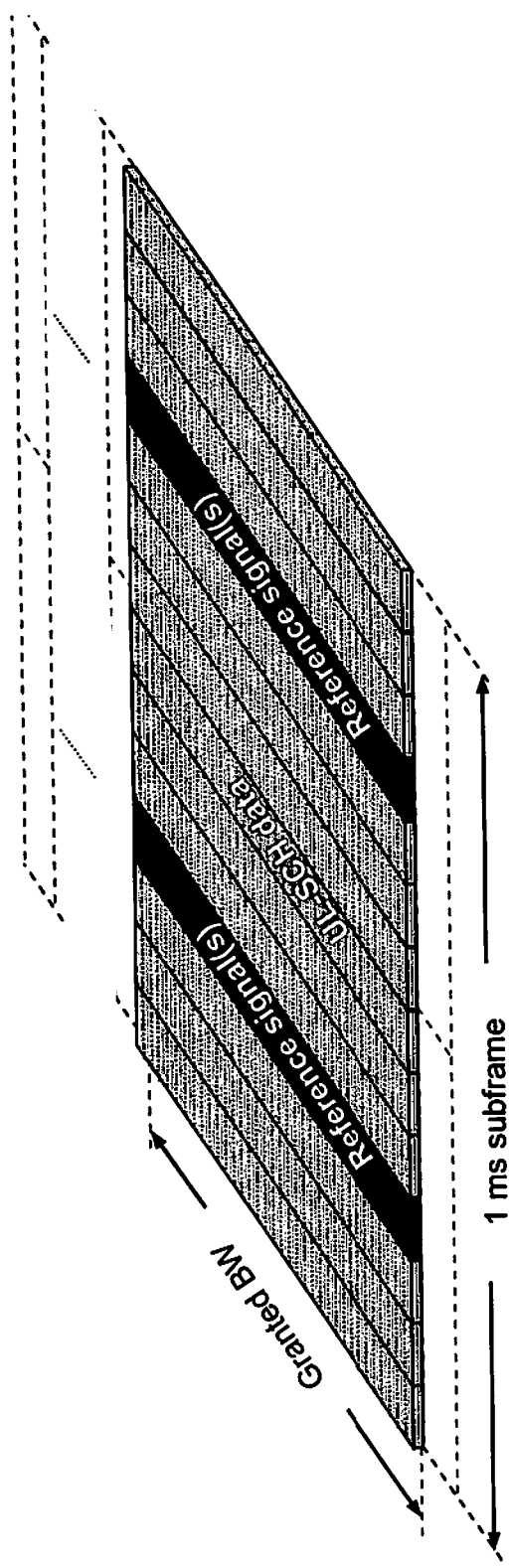
FIG. 6 is a block diagram illustrating an uplink transmission when the predefined uplink symbol should be used for data according to an example embodiment.

FIG. 6, shows the uplink transmission 504 (of FIG. 5) when the predefined uplink symbol should be used for data transmission according to a first alternative (corresponding to 503a of FIG. 5). The black symbols indicated as reference signals denote other reference signals than SRS and these other reference signals are used in all uplink transmission. Accordingly, FIG. 6 shows the case of PUSCH transmission when there is no additional transmission of SRS according to prior art, and the case when the mobile terminal is dynamically instructed to use the predefined uplink symbol for data transmission according to embodiments of the present invention.

Figure 7:
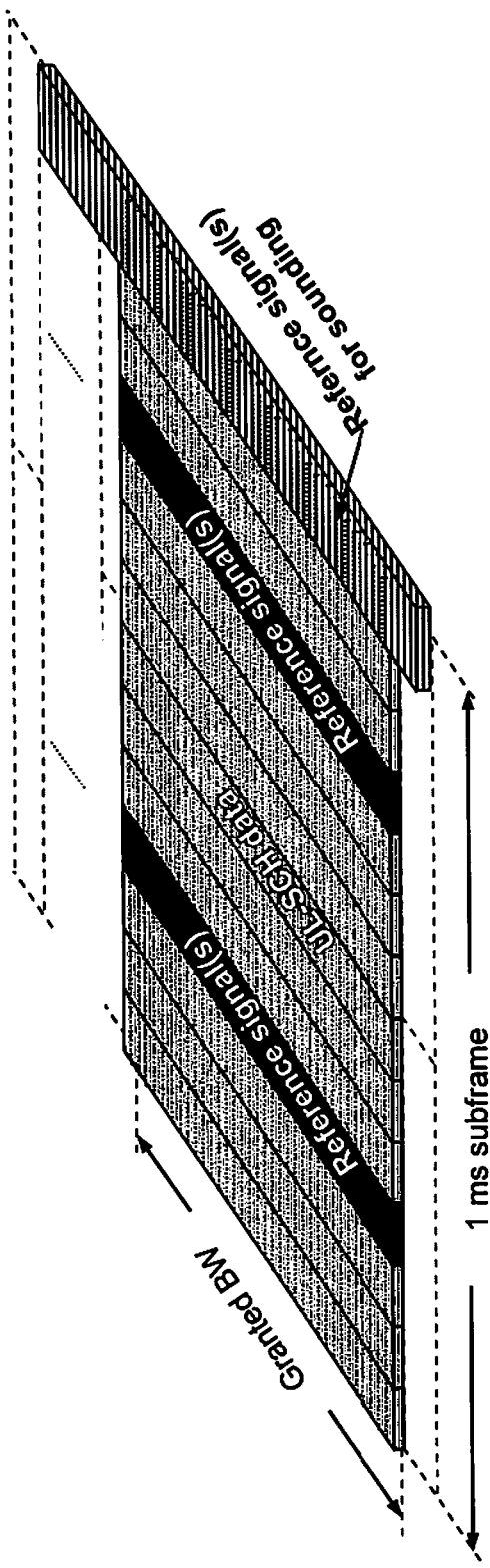
FIG. 7 is a block diagram illustrating an uplink transmission when the predefined uplink symbol should be used for sounding according to an example embodiment.

Further according to a second alternative (corresponding to 503b of FIG. 5), when the mobile terminal is to transmit additional SRS, for example when the mobile terminal is instructed to do so dynamically e.g. by means of an indicator in the uplink scheduling grant according to technical specification 3GPP TS 36.212 transmitted in a downlink subframe at least three subframes earlier. The transmission of the additional SRS is illustrated in FIG. 7.

Figure 8:
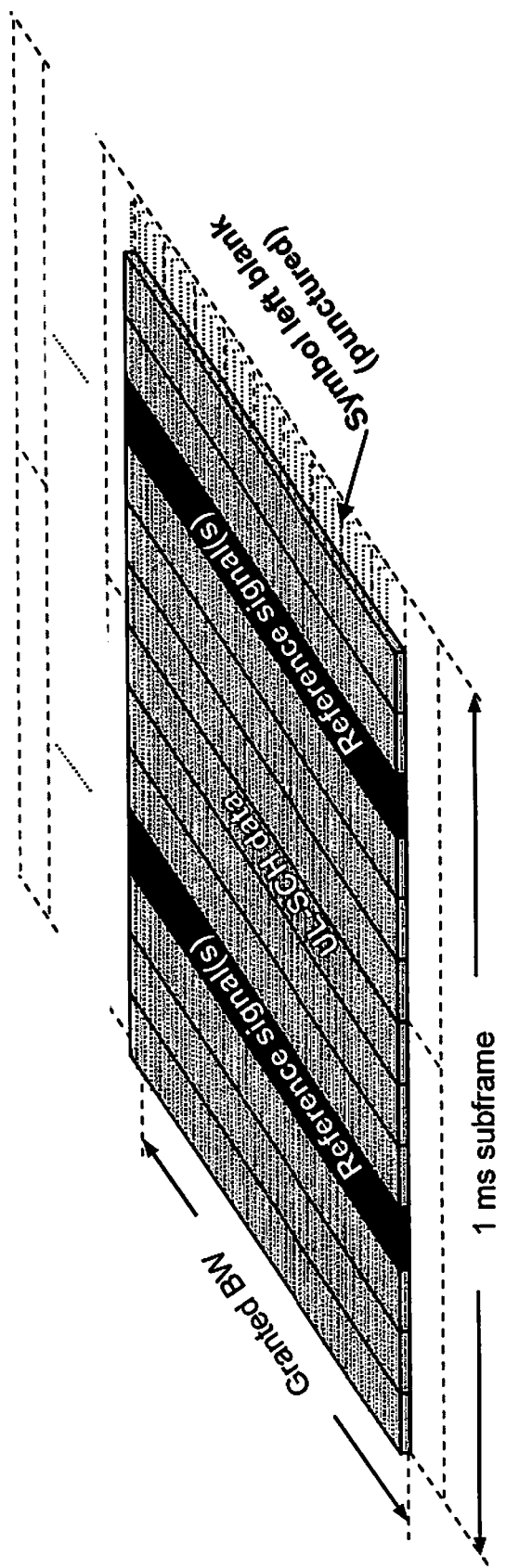
FIG. 8 is a block diagram illustrating an uplink transmission when the predefined uplink symbol should be left blank according to an example embodiment.

According to a third alternative (corresponding to 503c of FIG. 5), the mobile terminal is instructed to leave the predefined uplink symbol blank, so that another mobile terminal can use the resources for transmitting SRS. The transmission is illustrated in FIG. 8.

Figure 9:
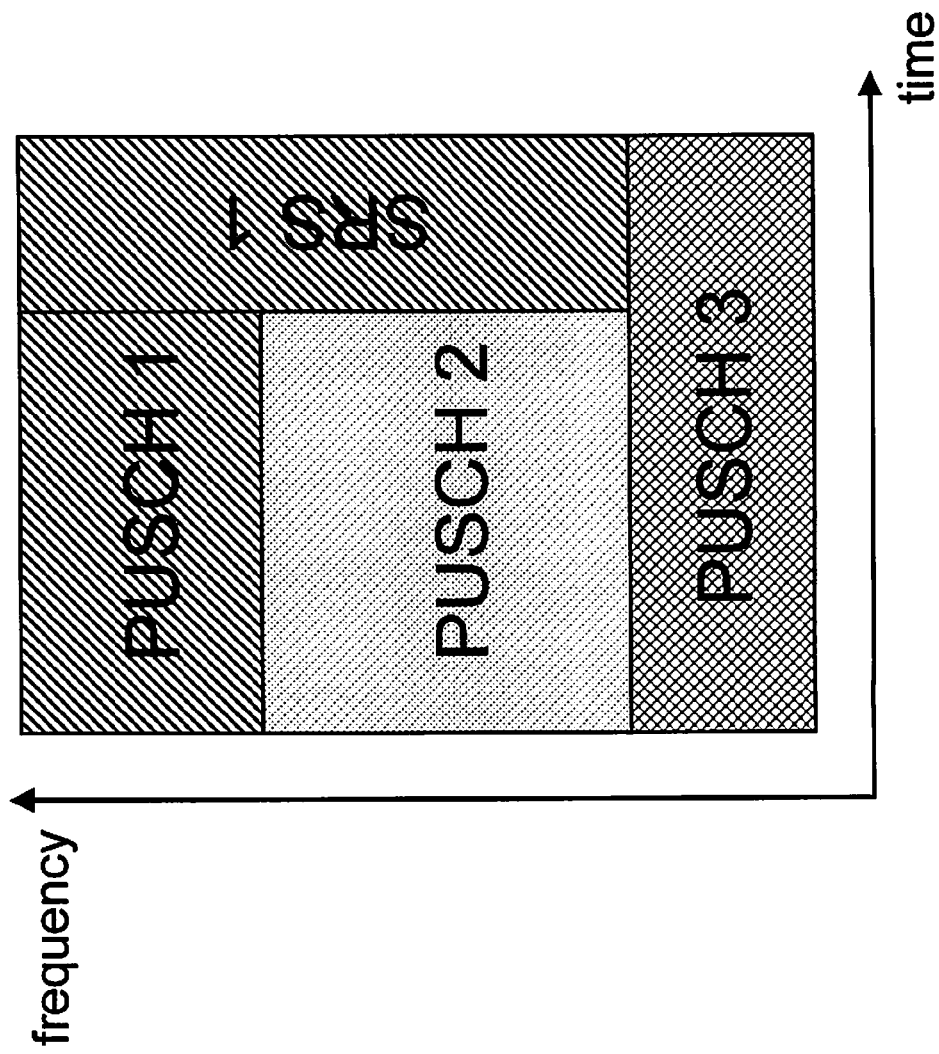
FIG. 9 is a block diagram illustrating the structure of data and sounding reference signals scheduled within one uplink subframe according to an example embodiment.

Turning now to FIG. 9 which provides an example to further describe the embodiments of the present invention. In the example, three mobile terminals are scheduled within one uplink (UL) subframe and dynamic SRS transmission is configured for mobile terminal 1 on the PUSCH, denoted as PUSCH 1, where the bandwidth of SRS transmission for mobile terminal 1, denoted as SRS 1, covers the total bandwidth of mobile terminal 1 plus the bandwidth of the mobile terminal 2. In this case the mobile terminal 1 needs to puncture its data and to insert SRS 1 at the end, the mobile terminal 2 has to puncture its data, and the mobile terminal 3 can continue its normal operation as instructed by the base station e.g. by means of the UL scheduling grant. FIG. 9 illustrates the structure of the data and the SRS.

Note that puncturing here is to be understood that data is not transmitted. This means the code rate or the transport block size can be adapted as well. The main meaning is that no data is transmitted in the predefined uplink symbol which instead e.g. can be used for SRS.

It should also be noted that the SRSs can be mapped to every second subcarrier in the frequency domain, as is the case for the sounding reference signals defined for Release 8/9 in LTE using a so called repetition factor of two, or be mapped to every subcarrier, as is the case with the uplink demodulation reference signals for Release 8/9 in LTE.

The present invention may be carried out in other ways than those specifically set forth herein without departing from essential characteristics of the invention. The embodiments described are to be considered in all respects as illustrative and not restrictive.

The invention claimed is:

1. A method in a base station for dynamically triggering a mobile terminal to transmit sounding reference signals (SRS), wherein a predefined uplink symbol of an uplink subframe is configured to be used by the mobile terminal for SRSs, the method comprising:
   determining whether or not the mobile terminal shall use the predefined uplink symbol for data transmission during uplink transmission;
   in response to determining that the mobile terminal shall not use the predefined uplink symbol for data transmission during uplink transmission, signaling to the mobile terminal a first instruction comprising:
      a first part that indicates that the mobile terminal shall not use the predefined uplink symbol for data transmission during uplink transmission; and
      a second part, distinct from the first part, that indicates one of:
         that the mobile terminal shall use the predefined uplink symbol for SRSs; or
         that the mobile terminal shall leave the predefined uplink symbol blank;
   in response to determining that the mobile terminal shall use the predefined uplink symbol for data transmission during uplink transmission, signaling to the mobile terminal a second instruction indicating that the mobile terminal shall use the predefined uplink symbol only for data transmission during uplink transmission.

2. The method according to claim 1, wherein the signaled instruction is valid for the predefined uplink symbol of one subsequent uplink subframe.

3. The method according to claim 1, wherein the signaled instruction is valid for the predefined uplink symbol of multiple subsequent uplink subframes.

4. The method according to claim 1, wherein said signaling comprises signaling the instruction as downlink control information carried by a physical downlink control channel.

5. The method according to claim 1, wherein, if the signaled instruction indicates the mobile terminal shall use the predefined uplink symbol for SRSs, the signaled instruction further indicates SRS parameters that are either semi-statically configured or are a function of the uplink subframe.

6. The method according to claim 1, wherein the signaled instruction comprises parameters, at least one of the parameters being signaled in an uplink grant.

7. A method in a mobile terminal for dynamically transmitting sounding reference signals, SRSs, wherein a predefined uplink symbol of an uplink subframe is configured to be used by the mobile terminal for SRSs, the method comprising:
   transmitting SRSs in the predefined uplink symbol in response to receiving a first instruction, the first instruction comprising:
      a first part that indicates that the mobile terminal shall not use the predefined uplink symbol for data transmission during uplink transmission; and
      a second part, distinct from the first part, that indicates that the mobile terminal shall use the predefined uplink symbol for SRSs;
   transmitting data in the predefined uplink symbol in response to receiving a second instruction, the second instruction indicating that the mobile terminal shall use the predefined uplink symbol only for data transmission during uplink transmission;
   leaving the predefined uplink symbol blank in response to receiving a third instruction, the third instruction comprising:
      a first piece that indicates that the mobile terminal shall not use the predefined uplink symbol for data transmission during uplink transmission; and
      a second piece, distinct from the first piece of the third instruction, that indicates that the mobile terminal shall leave the predefined uplink symbol blank.

8. The method according to claim 7, wherein the received instruction is valid for the predefined uplink symbol of one subsequent uplink subframe.

9. The method according to claim 7, wherein the received instruction is valid for the predefined uplink symbol of multiple subsequent uplink subframes.

10. The method according to claim 7, wherein the mobile terminal is configured by default to use the predefined uplink symbol for data transmission, and wherein leaving blank, or transmitting SRSs in, the predefined uplink symbol is contrary to said default configuration.

11. The method according to claim 7, wherein the mobile terminal is configured by default to not use the predefined uplink symbol for data transmission, wherein transmitting data in the predefined uplink symbol is contrary to said default configuration.

12. The method according to claim 7, wherein the instruction is received as downlink control information carried by a physical downlink control channel.

13. The method according to claim 7, wherein the first instruction further indicates SRS parameters that are either semi-statically configured or are a function of the uplink subframe.

14. The method according to claim 7, wherein the received instruction comprises parameters, at least one of the parameters being signaled in an uplink grant.

15. A base station for dynamically triggering a mobile terminal to transmit sounding reference signals, SRSs, wherein a predefined uplink symbol of an uplink subframe is configured to be used by the mobile terminal for SRSs, the base station comprising:
 a processor configured to determine whether or not the mobile terminal shall use the predefined uplink symbol for data transmission during uplink transmission; and
 a transmitter configured to signal to the mobile terminal, in response to determining that the mobile terminal shall not use the predefined uplink symbol for data transmission, a first instruction comprising:
  a first part that indicates that the mobile terminal shall not use the predefined uplink symbol for data transmission during uplink transmission; and
  a second part, distinct from the first part, that indicates one of:
   that the mobile terminal shall use the predefined uplink symbol for SRSs; or
   that the mobile terminal shall leave the predefined uplink symbol blank;
 the transmitter further configured to signal to the mobile terminal, in response to determining that the mobile terminal shall use the predefined uplink symbol for data transmission during uplink transmission, a second instruction indicating that the mobile terminal shall use the predefined uplink symbol only for data transmission during uplink transmission.

16. The base station according to claim 15, wherein the signaled instruction is valid for the predefined uplink symbol of one subsequent uplink subframe.

17. The base station according to claim 15, wherein the signaled instruction is valid for the predefined uplink symbol of multiple subsequent uplink subframes.

18. The base station according to claim 15, wherein the transmitter is configured to signal the instruction as downlink control information carried by a physical downlink control channel.

19. A mobile terminal for dynamically transmitting sounding reference signals, SRSs, wherein a predefined uplink symbol of an uplink subframe is configured to be used by the mobile terminal for SRSs, the mobile terminal comprising:
 a receiver configured to receive an instruction;
 a processor configured to determine whether the instruction received is a first instruction, a second instruction, or a third instruction;
 wherein the first instruction comprises:
  a first part that indicates that the mobile terminal shall not use the predefined uplink symbol for data transmission during uplink transmission; and
  a second part, distinct from the first part, that indicates that the mobile terminal shall use the predefined uplink symbol for SRSs;
 wherein the second instruction indicates that the mobile terminal shall use the predefined uplink symbol only for data transmission during uplink transmission;
 wherein the third instruction comprises:
  a first piece that indicates that the mobile terminal shall not use the predefined uplink symbol for data transmission during uplink transmission; and
  a second piece, distinct from the first piece of the third instruction, that indicates that the mobile terminal shall leave the predefined uplink symbol blank; and
 a transmitter configured to:
  transmit SRSs in the predefined uplink symbol in response to the processor determining that the first instruction has been received;
  transmit data in the predefined uplink symbol in response to the processor determining that the second instruction has been received;
  leave the predefined uplink symbol blank in response to the processor determining that the third instruction has been received.

20. The mobile terminal according to claim 19, wherein the received instruction is valid for the predefined uplink symbol of one subsequent uplink subframe.

21. The mobile terminal according to claim 19, wherein the received instruction is valid for the predefined uplink symbol of multiple subsequent uplink subframes.

22. The mobile terminal according to claim 19, wherein the receiver is configured to receive the instruction as downlink control information carried by a physical downlink control channel.

23. The mobile terminal according to claim 19, wherein the first instruction further indicates SRS parameters that are either semi-statically configured or are a function of the uplink subframe.

24. The mobile terminal according to claim 19, wherein the received instruction comprises parameters, at least one of the parameters being signaled in an uplink grant.

* * * * *

UNITED STATES PATENT AND TRADEMARK OFFICE
CERTIFICATE OF CORRECTION

| | | |
|---|---|---|
| PATENT NO. | : 8,817,719 B2 | Page 1 of 1 |
| APPLICATION NO. | : 13/256595 | |
| DATED | : August 26, 2014 | |
| INVENTOR(S) | : Behravan et al. | |

It is certified that error appears in the above-identified patent and that said Letters Patent is hereby corrected as shown below:

In the specification

In Column 5, Line 15, delete "DFTS-OFDMA." and insert -- DFTS-OFDM. --, therefor.

In Column 9, Line 21, delete "FIG. 9" and insert -- FIG. 9, --, therefor.

Signed and Sealed this
Sixteenth Day of February, 2016

Michelle K. Lee
*Director of the United States Patent and Trademark Office*